US007004501B2

(12) United States Patent
Schneider et al.

(10) Patent No.: US 7,004,501 B2
(45) Date of Patent: Feb. 28, 2006

(54) OVERHEAD AIRBAG CUSHION FOLD PATTERNS FOR IN-POSITION AND OUT-OF-POSITION PERFORMANCE

(76) Inventors: David W. Schneider, 4091 Highview Ct., Waterford, MI (US) 48239; ChangSoo Choi, 1338 Tulberry Cir., Rochester, MI (US) 48306

(*) Notice: Subject to any disclaimer, the term of this patent is extended or adjusted under 35 U.S.C. 154(b) by 267 days.

(21) Appl. No.: 10/459,351

(22) Filed: Jun. 11, 2003

(65) Prior Publication Data

US 2004/0251668 A1 Dec. 16, 2004

(51) Int. Cl.
*B60R 21/16* (2006.01)

(52) U.S. Cl. .................................................. 280/743.1

(58) Field of Classification Search ............ 280/743.1, 280/728.1, 730.1

See application file for complete search history.

(56) References Cited

U.S. PATENT DOCUMENTS

| | | | | |
|---|---|---|---|---|
| 5,366,241 | A | 11/1994 | Kithil | |
| 5,570,900 | A | 11/1996 | Brown | |
| 5,599,042 | A | 2/1997 | Shyr et al. | |
| 5,602,734 | A | 2/1997 | Kithil | |
| 5,855,393 | A * | 1/1999 | Keshavaraj | 280/743.1 |
| 6,460,878 | B1 | 10/2002 | Eckert et al. | |
| 6,547,709 | B1 | 4/2003 | Dennis | |
| 6,739,622 | B1 * | 5/2004 | Halford et al. | 280/743.1 |
| 2002/0084635 | A1 | 7/2002 | Tajima et al. | |
| 2002/0096864 | A1 | 7/2002 | Asano et al. | |
| 2002/0158451 | A1 | 10/2002 | Nusshor | |

FOREIGN PATENT DOCUMENTS

| | | |
|---|---|---|
| DE | 198 60 933 | 2/2002 |
| JP | 7-117605 | 5/1995 |

* cited by examiner

*Primary Examiner*—Faye M. Fleming
(74) *Attorney, Agent, or Firm*—Sally J Brown

(57) ABSTRACT

Folding methods and patterns for folding an inflatable airbag for use in vehicles are disclosed. The folding patterns and methods of the invention assist in controlling the trajectory of the airbag cushion during deployment. More specifically, the methods and patterns of the invention may be used to deploy an overhead airbag cushion forward and downward along a windshield to place a portion of the airbag cushion rapidly in front of a vehicle occupant before the cushion has the opportunity to inflate significantly in a longitudinal direction to provide support and deceleration to a vehicle occupant. These methods result in airbag deployment which may prevent injury to out-of-position vehicle occupants.

59 Claims, 4 Drawing Sheets

OVERHEAD AIRBAG CUSHION FOLD PATTERNS FOR IN-POSITION AND OUT-OF-POSITION PERFORMANCE

BACKGROUND OF THE INVENTION

1. Field of the Invention

The present invention relates to methods and patterns for folding airbag cushions. More specifically, the present invention relates to methods and patterns for folding airbag cushions used in overhead-mounted vehicular airbag modules.

2. Description of Related Art

Safety belts are designed to protect the occupants of a vehicle during events such as automobile collisions. In low-speed collisions, the occupants are generally protected from impact with objects located inside the vehicle such as the windshield, the instrument panel, a door, the side windows, or the steering wheel by the action of the safety belt. In more severe collisions, however, even belted occupants may experience an impact with the car's interior. Airbag systems were developed to supplement conventional safety belts by deploying into the space between an occupant and an interior object or surface in the vehicle during a collision event. The airbag acts to decelerate the occupant, thus reducing the chances of injury to the occupant caused by contact with the vehicle's interior.

Many typical airbag systems consist of several individual components joined to form an operational module. Such components generally include an airbag cushion, an airbag inflator, a sensor, and an electronic control unit. Airbag cushions are typically made of a thin, durable fabric that is folded to fit into a compartment of a steering wheel, dashboard, interior compartment, roof, roof rail, roof compartment, or other space in a vehicle. The airbag inflator is in fluid communication with the airbag cushion, and is configured to produce a gas to inflate the cushion when it is needed. The sensors detect sudden decelerations of the vehicle that are characteristic of an impact. The readings taken by the sensors are processed in the electronic control unit using an algorithm to determine whether a collision has occurred.

Upon detection of an impact of sufficient severity, the control unit sends an electrical signal to the inflator. The inflator uses one of many technologies, including pyrotechnic compounds and pressurized gas, to produce a volume of an inflation gas. The inflation gas is channeled into the airbag, inflating it. Inflation of the airbag causes it to deploy, placing it in position to receive the impact of a vehicle occupant. After contact of the occupant with the airbag and the corresponding deceleration of the occupant, the airbag rapidly deflates. To accomplish this, the inflation gas is vented from openings in the airbag, deflating it and freeing the occupant to exit the vehicle.

As experience in the manufacture and use of airbags has increased, the engineering challenges involved in their design, construction, and use have become better understood. Most airbag systems are designed to rapidly inflate and provide a cushion in proximity to a vehicle occupant. Many such cushions are configured to be placed in front of a vehicle occupant. Placement of the cushions is determined based on presumptions made of the position of a vehicle occupant during normal operation of the vehicle. Thus, a vehicle occupant enjoys optimal protection from a specific airbag when the occupant is in the presumed range of positions when the airbag deploys.

In some situations, injuries have been noted to occur when the occupant is "out of position" with regard to the presumed position discussed above. Injuries similar to out of position injuries may also result from improper deployment of the airbag. Improper deployment may result in either poor placement of the cushion when contacted by a vehicle occupant or incursion of the airbag cushion into the space reserved for the vehicle occupant. Such incursion during deployment may raise the probability of injury to the vehicle occupant.

Overhead airbag systems were developed as an alternative to frontally-placed airbag cushions. Such overhead cushions are advantageous in some situations since they deploy into position without exerting a force directly toward the vehicle occupant. In addition, positioning of the primary airbag in the roof of the vehicle when stored allows for greater design flexibility of the steering wheel and/or dashboard components of the vehicle.

One difficulty faced in the design and installation of overhead airbags is that the trajectory of deploying overhead airbags must be carefully controlled. One reason for this is that due to their placement in a vehicle, overhead airbags may encounter sun visors or other roof-mounted accessories during deployment. Such obstacles may deflect or trap an inflating airbag cushion, thus compromising the protection provided to the vehicle occupant. In addition, because overhead airbag cushion modules are generally placed above vehicle occupants in vehicles, their rapid deployment downward into a vehicle cabin may place a vehicle occupant at risk of injury. This risk may be heightened when the vehicle occupant is out of the position anticipated for them in the vehicle by the vehicles' engineers. More specifically, in some situations, if airbags inflate rapidly and fully as they emerge from the roof, they may impinge into space reserved for the head and/or upper body of a vehicle occupant, thus creating a potential for injury.

Accordingly, a need exists for methods of regulating the deployment trajectory of an overhead airbag cushion. More specifically, a need exists for novel folding patterns and methods for use with overhead airbag cushions and modules to improve overhead airbag performance. Such novel folding patterns are provided herein.

SUMMARY OF THE INVENTION

The apparatus of the present invention has been developed in response to the present state of the art, and in particular, in response to the problems and needs in the art that have not yet been fully solved by currently available airbag folding patterns and methods. Thus, the present invention provides novel methods and patterns for folding inflatable automobile airbag cushions such as overhead airbag cushions.

In accordance with the invention as embodied and broadly described herein in the preferred embodiment, methods and patterns for folding vehicular airbag cushions such as overhead airbag cushions are provided. According to one configuration, the method may comprise the steps of providing an airbag cushion, flattening the airbag cushion, tucking a portion of the airbag cushion inwardly, folding lateral sides of the airbag cushion inwardly to flatten them against the airbag cushion, rolling a portion of the airbag cushion, accordion-folding a portion of the airbag cushion, and wrap-folding the airbag cushion. Airbag cushions used in the methods of the invention are commonly defined as having a cushion throat, a windshield face, an occupant face, first and second lateral sides, and a cushion end. These reference points are useful in describing method steps of specific embodiments of the invention and variations of the methods of the invention existing within its scope.

Thus, in some specific folding methods of the invention, the method of folding an airbag cushion comprises the steps of providing an airbag cushion, the airbag cushion having a cushion throat, a windshield face, an occupant face, first and second lateral sides, and a cushion end; flattening the windshield and occupant faces of the airbag cushion; tucking the cushion end inwardly to form a bottom tuck, and first and second pairs of lateral edges; folding the first and second lateral sides of the airbag cushion to flatten them against a face of the airbag cushion; rolling a portion of the airbag cushion from the cushion end toward the cushion throat; accordion-folding the airbag cushion from the rolled portion toward the cushion throat; and wrap-folding the airbag cushion toward the cushion throat. According to the invention, the airbag cushion may be an overhead airbag cushion.

In the methods of the invention, the step of folding the first and second lateral sides of the airbag to flatten them against a face of the airbag cushion may comprise folding the first and second lateral sides over against the windshield face of the airbag cushion. Alternately, the step of folding the first and second lateral sides of the airbag to flatten them against a face of the airbag cushion may comprise folding the first and second lateral sides against the occupant face of the airbag cushion. Further, this lateral side folding step may be conducted such that it produces an overlap of the first and second lateral sides.

In the methods and patterns of the invention, the portion of the airbag cushion rolled from the cushion end toward the cushion throat may be selected to be a portion of the airbag desired to deploy following the initial deployment and placement of the wrap-folded and accordion-folded portions of the airbag cushion. In addition, the portion of the airbag cushion rolled from the cushion end toward the cushion throat may either be rolled toward the windshield face of the airbag cushion, or rolled toward the occupant face of the airbag cushion.

In addition, according to the methods of the invention, the portion of the airbag cushion folded during the step of accordion-folding the airbag cushion from the rolled portion toward the cushion throat is a portion of the airbag configured to deploy during initial deployment and following unfolding of the wrap-folded portion of the airbag cushion. Within the scope of the invention, the step of accordion-folding the airbag cushion from the rolled portion forward toward the cushion throat may produce from about 0 to about 8 accordion folds, from about 1 to about 4 accordion folds, or about 2 accordion folds. The number and size of accordion folds made in the methods and patterns of the invention may be widely varied by one of ordinary skill in the art. In some of the methods of the invention, no accordion folds are made, and wrap-folds, including overlapping wrap folds, may be substituted in their place.

The step of wrap-folding the airbag cushion toward the cushion throat in the methods and patterns of the invention may comprise folding the airbag cushion about portions of the rolled and accordion-folded sections of the airbag cushion. In various methods, the step of wrap-folding the airbag cushion may comprise folding the airbag cushion about the rolled and accordion-folded portions of the airbag cushion toward the occupant face of the airbag cushion. This may introduce a rearward-directed roll to the airbag cushion upon deployment which will aid its full deployment from an airbag module housing.

Within the scope of the invention, the wrap-fold may encompass the rolled and accordion-folded portions of the airbag cushion in a substantially complete manner. Alternatively, the wrap-fold may encompass only fractional portions of the airbag cushion, with exemplary variations encompassing about ¾ of the rolled and accordion-folded portions of the airbag cushion, about ½ of the rolled and accordion-folded portions of the airbag cushion, or about ¼ of the rolled and accordion-folded portions of the airbag cushion. In some alternate embodiments of the invention, the step of wrap-folding the airbag cushion may comprise folding the airbag cushion about the rolled and accordion-folded portions of the airbag cushion toward the windshield face of the airbag cushion. In still other variations of the invention, the step of wrap-folding the airbag cushion may begin by folding toward the windshield face and subsequently double back upon itself to provide a rearward-directed roll. In still other embodiments of the methods of the invention, the wrap-folding step may be skipped entirely, while in others, additional accordion-folds may be used in place of a wrap-fold.

In some methods of the invention, the geometry of the specific airbag cushion used may render the step of tucking the cushion end inwardly to form a bottom tuck unnecessary. In other instances, the geometry of the specific airbag cushion used may demand the use of multiple tucking steps. In some cases, producing these single or double tucks may produce multiple sets of lateral edges which may be folded inwardly in subsequent steps as groups, or individually.

In some applications, the size of the rolled portion of the airbag cushion may be varied to either increase or decrease the portion of the airbag cushion folded using accordion- and wrap-folding for rapid deployment. In other applications, as briefly discussed above, wrap-folding and accordion-folding may be individually increased or reduced. In still other applications, either wrap-folding or accordion-folding may be omitted.

The patterns and methods of the invention may be specifically useful in overhead airbag applications. Alternatively, however, the patterns and methods of the invention may be useful in other airbag applications including, but not limited to side curtain airbags and vehicle pillar airbags.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
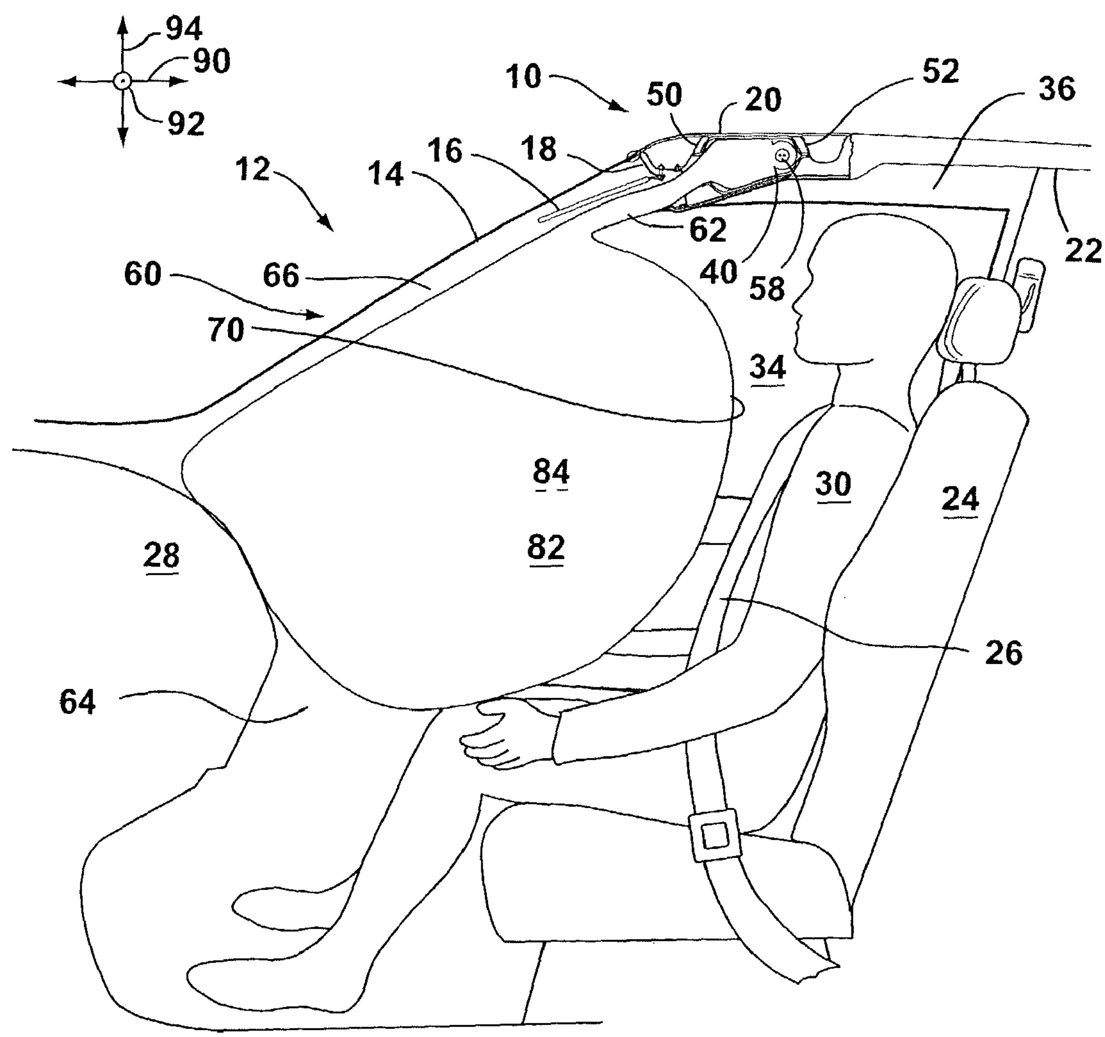
FIG. 1 is a partial perspective view of a vehicle showing an overhead airbag deployed and inflated in front of a vehicle occupant.
Figure 2:
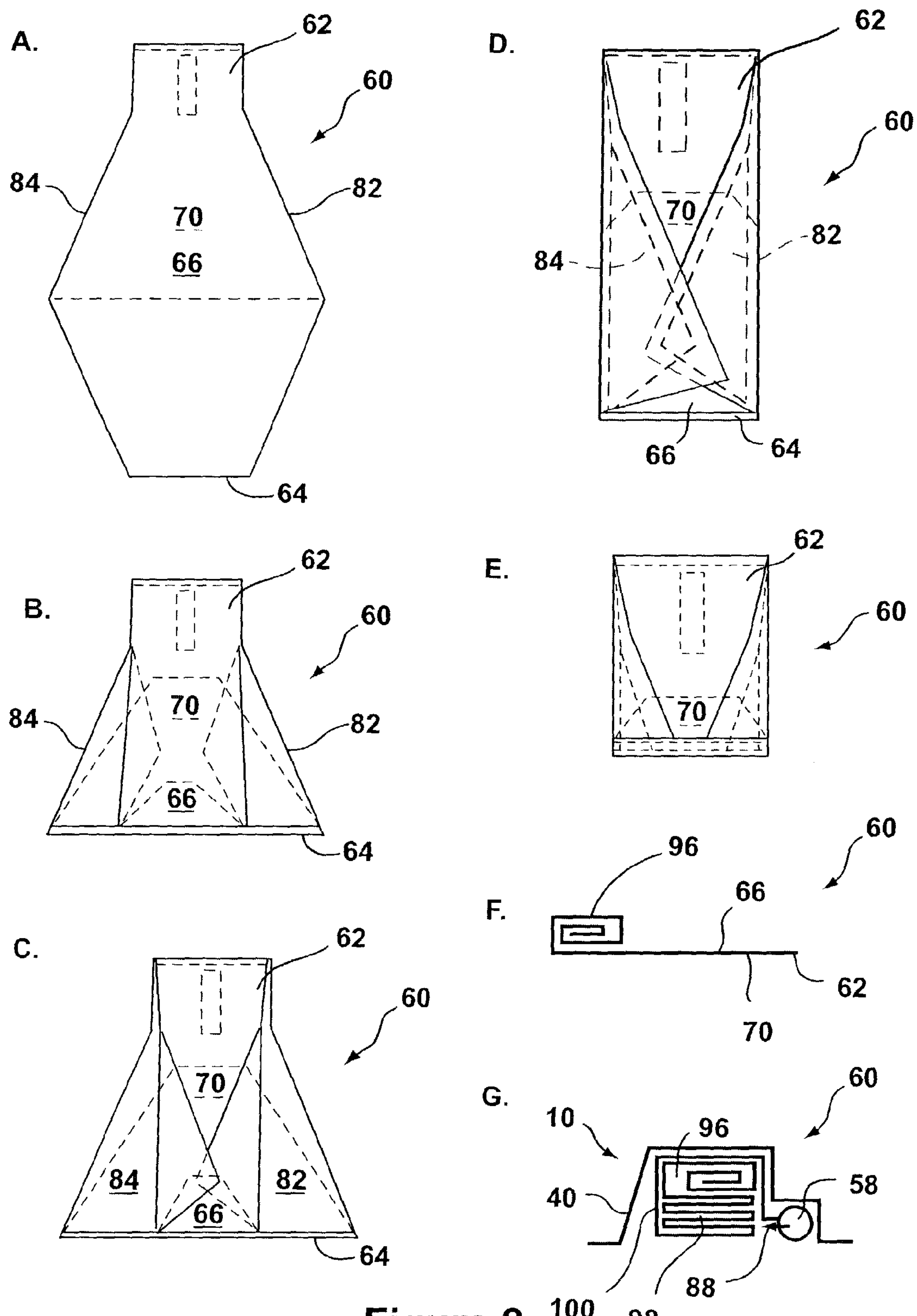
FIG. 2A shows an initial flattening step of a method of folding an airbag according to the invention.
FIG. 2B shows the configuration produced by an upward tuck-folding step of a method of folding an airbag according to the invention.
FIG. 2C shows an intermediate folding step of a method of folding an airbag according to the invention.
FIG. 2D shows another intermediate folding step of a method of folding an airbag according to the invention.
FIG. 2E shows a rolling step of a method of folding an airbag according to the invention.
FIG. 2F shows a side plan view of the partially-rolled airbag shown in FIG. 2D.
FIG. 2G shows a side plan view of an airbag cushion folded according to a method of the invention and placed within an airbag module housing and attached to an airbag inflator.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4H, is not intended to limit the scope of the invention, as claimed, but is merely representative of presently preferred embodiments of the invention.

The production of airbag systems capable of being stowed and deployed from the roof of a vehicle provides additional flexibility to vehicle designers and gives safety engineers another option for protecting vehicle occupants in specific vehicle designs. Although innovative and effective, overhead airbag systems also face difficulties in their design and implementation.

A first difficulty presented by currently used overhead airbag systems is proper deployment of the airbag from its housing in the roof of a vehicle. Some known overhead airbag systems suffer from diminished function in that their airbag cushions may become lodged in their housings during deployment. As a result, the airbag cushion may deploy in a skewed, incomplete, and/or potentially dangerous manner. In addition, because overhead airbag cushions deploy from the roof, common interior vehicle accessories such as rearview mirrors and sun visors, may be commonly positioned in the path of the deploying airbags. Such obstacles may also impede proper positioning and deployment of the cushion and potentially compromise the protection desired to be provided to the vehicle occupant.

In addition to the above, because overhead airbag modules are often positioned substantially above a vehicle occupant in a vehicle, their trajectory must be carefully tuned to prevent entry of the airbag cushion into space reserved for the vehicle occupant. This assures that when the vehicle occupant is properly positioned within the vehicle when the airbag cushion is deployed, the airbag cushion may inflate without contacting the occupant.

In addition, in some collision events, the vehicle occupant may be in a position not anticipated by safety engineers. Such occupants may be subject to a higher risk of injury by a deploying airbag because of their improper placement. In the case of overhead airbags, some out-of-position injuries to occupants may occur when a cushion expands too rapidly during deployment as it exits the airbag module housing. In such events, the airbag cushion may still be near the area reserved for a vehicle occupant's head or upper body when it begins to longitudinally expand. This early expansion in close proximity to the occupant may raise the potential for injury.

The airbag folding patterns and methods of the invention help to provide a degree of control over the trajectory of a deploying overhead airbag. More specifically, the folding patterns of the invention help to assure complete exit of a folded airbag cushion from an airbag module housing, assist the airbag cushion in deploying rapidly forward and down along the contour of the windshield prior to significant longitudinal cushion expansion, and then allow complete and rapid inflation of the properly-positioned airbag cushion to support and decelerate a vehicle occupant during a collision event.

Referring first to FIG. 1, a partial perspective view of a vehicle 12 is shown. In FIG. 1, an overhead airbag module 10 is shown installed in a vehicle, with the overhead airbag cushion 60 deployed and inflated in front of a vehicle occupant 30. The vehicle 12 includes a dashboard 28 and windshield 14 positioned in front of the vehicle occupant 30. The vehicle occupant 30 is further encompassed in a lateral direction 92 by a door 36 and side window 34, and is shown seated on a vehicle seat 24 and restrained by a seatbelt 26.

The vehicle 12 is further shown to include an overhead airbag module 10 mounted in the roof 20 of the vehicle 12 substantially above the vehicle occupant 30 in a transverse direction 94. The airbag module 10 is shown to include an airbag module housing 40 attached to the vehicle roof 20 by front and rear housing mounts 50, 52, and 20 further enclosed by headliner trim 22. The airbag module 10 may include an airbag inflator 58 attached to an overhead airbag cushion 60 such that inflation gas produced by the inflator 58 may pass freely into the airbag cushion 60 to drive its deployment from the airbag module housing 40 in the roof 20 and out into the interior of the vehicle 12 between the vehicle occupant 30 and other surface features of the vehicle 12 such as the dashboard 28 and windshield 14.

The overhead airbag cushion 60 is an inflatable cushion configured to receive inflation gas from the airbag inflator 58. The overhead airbag cushion 60 is configured to be positioned substantially above a vehicle occupant 30 in a transverse direction 94 within a roof 20 of a vehicle 12. During a collision event, the overhead airbag module 10 is configured to place an inflated airbag cushion 60 rapidly and reliably in front of a vehicle occupant 30. The airbag cushion 60 may be stored in an airbag module housing 40 which may be attached to the roof 20 of the vehicle 12 by front and rear mounts 50, 52. In some airbag modules 10, an airbag inflator 58, connected to the airbag cushion 60 may also be contained within the housing 40. During normal operation of the vehicle 12, the airbag module 10 is largely obscured by headliner trim 22, which may be at least partially displaced upon deployment of the airbag cushion 60.

The airbag cushion 60 may be mounted to the vehicle 12 and airbag inflator 58 at a region or the cushion 60 referred to as the cushion throat 62. The length, shape, and configuration of the cushion throat 62 may be adapted to render the airbag cushion 60 suitable for use with various suitable airbag inflators and securing apparatus, as well as to render its use suitable in a wide variety of vehicles. The design of the cushion throat 62, and indeed, of the cushion 60 itself may be varied to allow use in either the passenger's side of a vehicle 12 or the driver's side of a vehicle 12. Such adaptations and modifications are known to one of ordinary skill in the art.

The airbag cushion 60 has a windshield face 66, an occupant face 70, an inboard cushion face 82, and an outboard cushion face 84. When deployed, the windshield face 66 of the cushion 60 faces the windshield 14 of the vehicle, while the occupant face 70 is deployed before the vehicle occupant 30 such that as the occupant 30 travels forward through the vehicle 12 during a collision event, the occupant 30 contacts the occupant face 70 of the cushion 60, which decelerates the occupant 30. The airbag cushion 60 further includes inboard and outboard faces 82 and 84, which face the cabin and sidewalls of the vehicle 12, respectively.

Referring now to FIGS. 2A–2F, the steps of a method of folding an airbag cushion of the invention according to the folding patterns of the invention are shown. Referring first to FIG. 2A, an airbag 60 is shown with the windshield face 66 and the occupant face 70 flattened in a first step of the folding patterns and methods of the invention. The cushion throat 62 is shown oriented at the top of FIG. 2A, while the cushion end 64 is shown at the bottom of FIG. 2A.

According to folding methods of the invention, the airbag cushion 60 may next either proceed to the folding steps illustrated in FIGS. 2C through 2G, or it may undergo an intermediate step in which be the cushion 60 is tuck-folded from the cushion end 64 inwardly toward the cushion throat 62. In some cases, the bottom tuck-folding step is useful where the airbag cushion is large or long. FIGS. 2B through 2G portray a cushion 60 which has two bottom tuck-folds. Producing such tuck-folds may additionally produce sets of lateral edges such as inboard and outboard edges 82, 84 shown in FIGS. 2B–2D. These lateral edges may be folded inwardly either individually or all together within the scope of the invention. In addition, the lateral edges may be overlapped when folded. One of skill in the art would understand that the folding patterns of the invention may be easily adapted to accommodate other airbag cushions in which tuck-folding is unnecessary.

Referring next to FIG. 2C, the airbag cushion 60 of FIG. 2B is shown. In this Figure, the inboard 82 and outboard 84 edges of the airbag cushion 50 are shown to be folded inwardly. More specifically, the inboard and outboard edges 82, 84 of the windshield face 66 of the airbag cushion 60 are shown to have been folded inwardly and flattened against the windshield face 66 of the airbag cushion 60. The edges 82, 84 may be folded such that they overlap each other. In folding patterns and methods in which there are bottom tucks, both the occupant face and the windshield face each include a pair of inboard and outboard edges 82, 84. This may change dependent on the geometry of the particular airbag being folded, as is understood by one of skill in the art. In airbag cushions not receiving bottom tucks, there may be only single inboard and outboard edges 82, 84, which could either then receive a lateral tuck if width considerations merited, or which could simply be folded inward before proceeding to the remaining folding steps. As shown in FIG. 2C, each member of the pairs of inboard and outboard edges 82, 84 of the airbag cushion 60 may be folded over individually, or they may be folded over as a group. As shown, in order to accommodate the folded airbag cushion 60 within a housing of a vehicle, the inboard and outboard edges 82, 84 may be overlapped to provide a narrower configuration.

Referring next to FIG. 2D, the airbag cushion 50 is shown having the pairs of inboard and outboard edges 82, 84 completely folded inward to provide a narrow, elongated partially-folded airbag. As discussed briefly above, and shown in FIG. 2D, the pairs of inboard and outboard edges 82, 84 may be overlapped to regulate the width of the folded airbag.

Referring next to FIG. 2E, the partially-folded airbag cushion 60 of FIG. 2D is shown having undergone a following step of the folding methods and patterns of the invention. More specifically, in FIG. 2E, the airbag cushion 60 of FIG. 2D has been partially rolled, beginning at the cushion end 64 (or in this case the cushion end 64 produced after the cushion received the bottom tuck folds), and proceeding toward the cushion throat 62. FIG. 2F is a side plan view of the folded and partially-rolled airbag cushion 60 of FIG. 2E, showing that the cushion 60 has been rolled toward the windshield face 66 of the airbag cushion 60. is It should be noted that the amount of the cushion 60 that is rolled may be varied within the scope of the invention, as will be discussed in connection with FIG. 3 below. Further, the direction of the roll may be varied within the scope of the invention. One example of this would be rolling the cushion 60 toward the occupant face 70 of the cushion 60 instead of toward the windshield face 66 of the cushion 60.

Referring next to FIG. 2G, the airbag cushion 60 of FIGS. 2E and 2F is shown having received two final folding steps and being placed within an airbag module housing 40 and attached to an airbag inflator 58. First, the airbag cushion 60 received two additional folding steps. A first such folding step was the insertion of accordion folds 98 following the rolled portion 96 of the airbag cushion 60. In this embodiment of the invention, the airbag cushion 60 received two accordion folds 98. The number and dimensions of such folds may be widely varied within the scope of the invention, as will be discussed in greater detail below.

The cushion 60 next received a wrap-fold 100, which in this instance is shown to almost completely encompass the accordion folds 98 and the rolled portion 96 of the airbag cushion. The extent and orientation of this roll fold 100 may also be varied widely within the'scope of the invention. In the context of FIG. 2G, the rolled portion 96 is positioned on top of the accordion folds 98, furthest away from the interior of the vehicle, which would be below the airbag module housing 40. Further, the wrap fold 100 proceeds from a bottom rear corner of the folded cushion 60 (oriented toward the rear of the vehicle) away toward the front of the vehicle, then up and around the accordion folds 98 and rolled portion 96. In effect, the wrap fold 100 is a large roll-fold about the remainder of the cushion 60.

In FIG. 2G, the wrap fold 100 is shown to orient the cushion 60 such that when it drops from the housing 40, the cushion 60 will begin to roll toward the rear of the vehicle in which it is mounted. In this configuration, when the airbag inflator 58 initiates, producing a jet of inflation gases traveling in a direction 88, the gases are forced upward as they travel into the wrap fold 100, then around and down. The rearward roll imparted to the airbag cushion and the direction of inflation gas upward into the top of the housing 40 assists in displacing the airbag cushion 60 from the housing 40, helping to assure complete and proper deployment of the cushion 60. This may be varied within the scope of the invention to produce a wrap traveling the opposite direction—toward the front of the vehicle. Such a property may be useful in circumstances when the airbag inflator 58 is positioned forward in the vehicle ahead of the cushion 60. More specifically, reversing the wrap direction and placement of the inflator 58 will assist deployment of the airbag cushion 60 from the housing 40, as described above.

Figure 3:
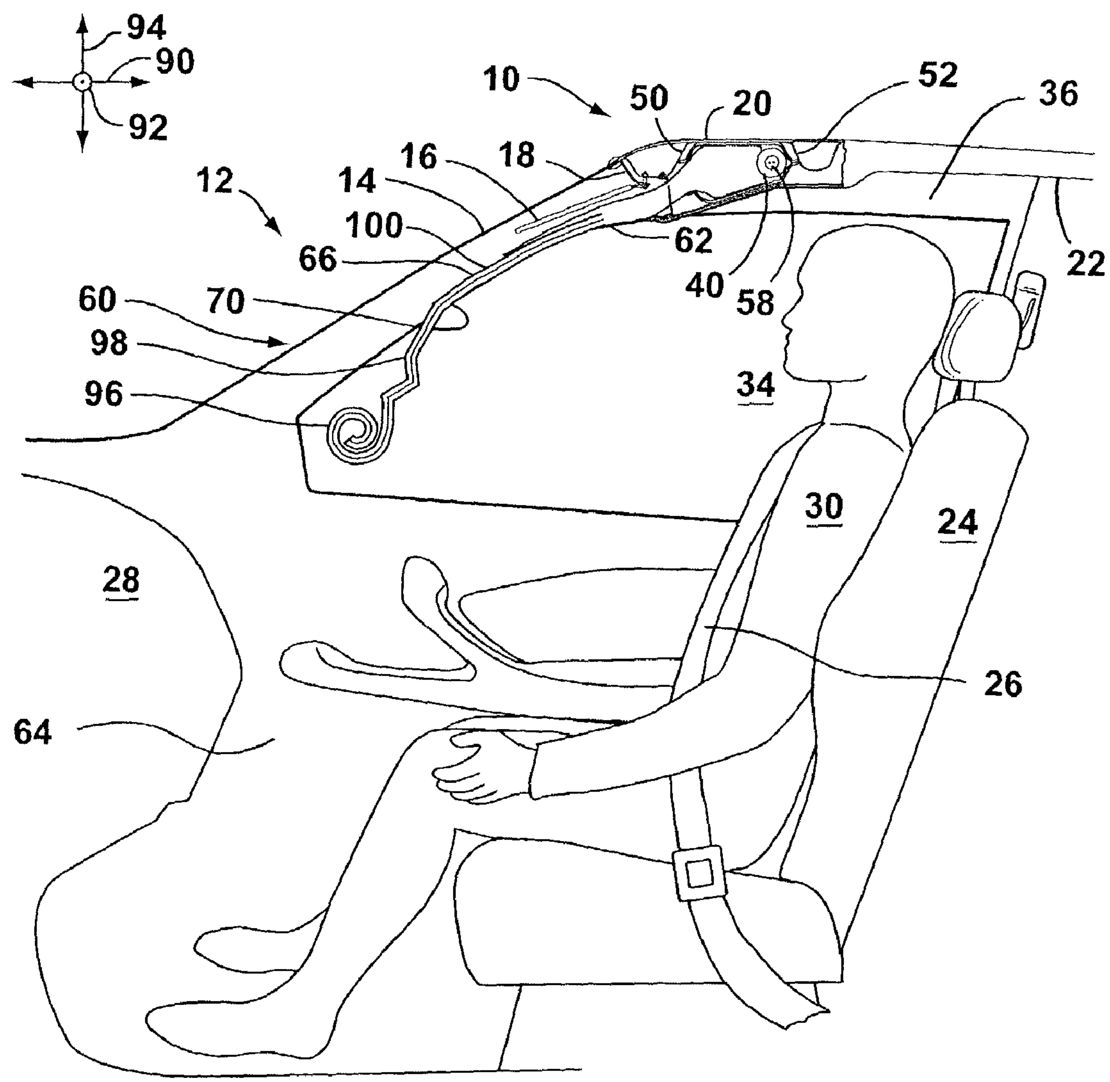
FIG. 3 is a partial perspective view of a vehicle showing an overhead airbag in process of being deployed and inflated in front of a vehicle occupant.
Figure 4:
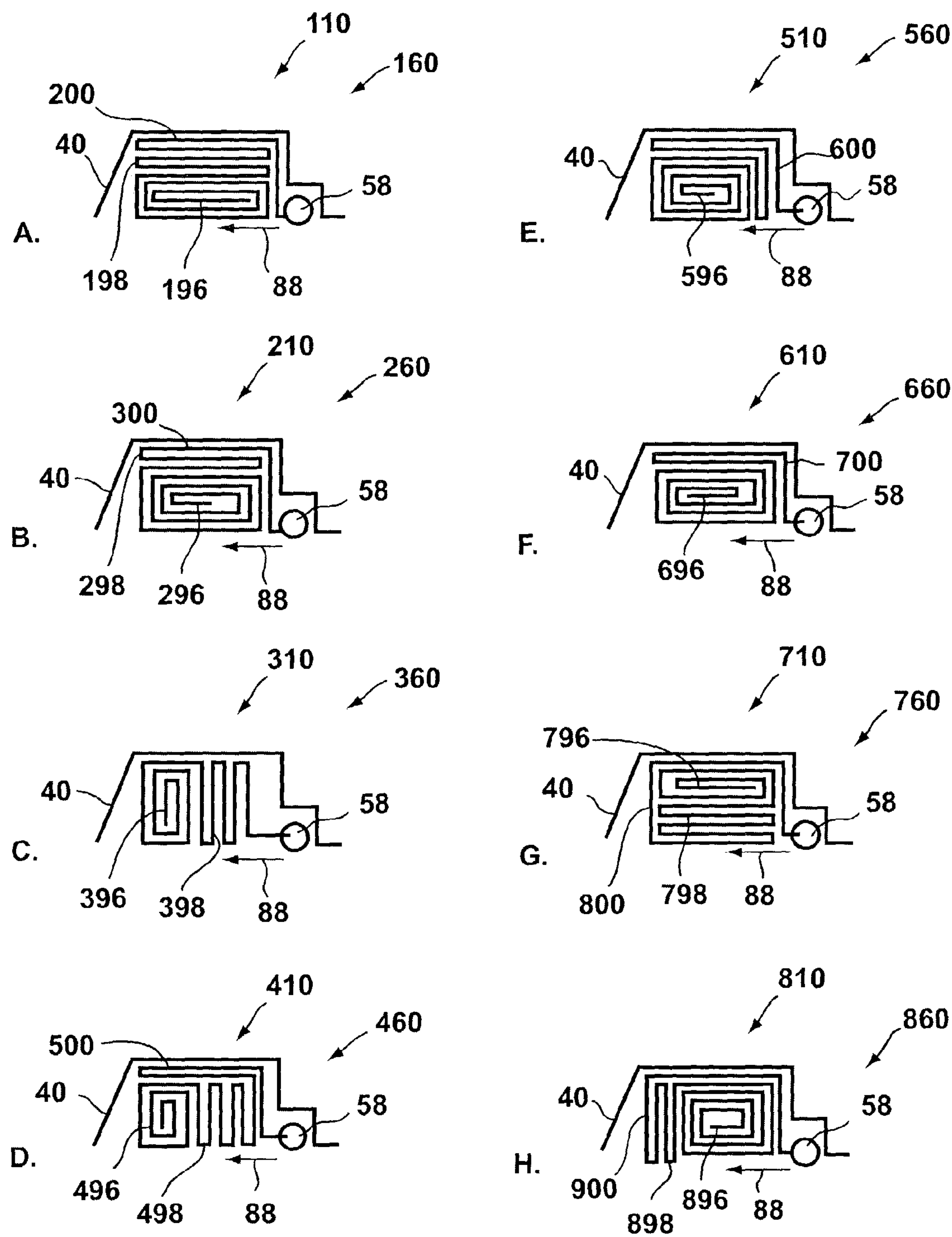
FIG. 4A shows a side plan view of an airbag cushion folded according to an alternate method of the invention resulting in an alternate folded orientation, the airbag cushion being folded and placed within an airbag module housing and attached to an airbag inflator.
FIG. 4B shows a side plan view of an airbag cushion folded according to an alternate method of the invention resulting in a folded configuration producing fewer accordion folds, the airbag cushion being folded and placed within an airbag module housing and attached to an airbag inflator.
FIG. 4C shows a side plan view of an airbag cushion folded according to an alternate method of the invention resulting in a folded configuration using accordion-folds, the airbag cushion being folded and placed within an airbag module housing and attached to an airbag inflator.
FIG. 4D shows a side plan view of an airbag cushion folded according to an alternate method of the invention resulting in a folded configuration having a ½ rearward roll, the airbag cushion being folded and placed within an airbag module housing and attached to an airbag inflator.
FIG. 4E shows a side plan view of an airbag cushion folded according to an alternate method of the invention resulting in a folded configuration having no accordion folds, the airbag cushion being folded and placed within an airbag module housing and attached to an airbag inflator.
FIG. 4F shows a side plan view of an airbag cushion folded according to a method of the invention resulting in a folded configuration having a windshield-facing roll and no accordion-folding, the airbag cushion being folded and placed within an airbag module housing and attached to an airbag inflator.
FIG. 4G shows a side plan view of an airbag cushion folded according to a method of the invention resulting in a folded configuration having a nearly-complete occupant face-oriented wrap, the airbag cushion being folded and placed within an airbag module housing and attached to an airbag inflator.
FIG. 4H shows a side plan view of an airbag cushion folded according to a method of the invention resulting in a folded configuration having a ¾ occupant face-oriented wrap, the airbag cushion being folded and placed within an airbag module housing and attached to an airbag inflator.

Referring now to FIG. 3, the airbag module 10 of FIG. 2G is shown mounted in a vehicle 12 and partially deployed. First, the airbag module 10 is shown to be mounted in a roof portion 20 of the vehicle 12. In some mounting schemes, front and rear housing mounts 50, 52 may be used to properly retain the housing in the roof 20 of the vehicle 12. A roof trim or headliner 22 may then be used to obscure the module 10 from view during normal operation of the vehicle 12, while being displaceable, as seen in FIG. 3, to permit deployment of the airbag cushion 60 when needed.

To deploy the airbag 60, the inflator 58 produces a jet of gas which begins to fill the cushion 60, and displacing it from the housing 40 as described above. As also described above, the direction in which the wrap fold 100 was made imparts a rearward roll to the ejecting cushion 60. In FIG. 3, the wrap fold 100 is shown to have fully unfolded. According to the folding patterns of the invention, the wrap fold portion of the airbag 100 is configured to assist escape of the airbag cushion 60 from the housing 40, and then to unroll rapidly. Because the wrapped portion 100 of the cushion 60 unrolls rapidly, the gas produced by the inflator 58 will generally direct the airbag cushion forward in the vehicle 12, forward along the windshield 14, while gravity pulls the cushion 60 downward toward the dashboard 28.

In addition, because the wrapped portion 100 unrolls rapidly, this forward positioning in the vehicle 12 occurs before the airbag cushion 60 has begun to expand significantly toward the vehicle occupant 30, shown positioned in a front seat 24. As the inflation gases advance through the cushion 60, they next encounter the accordion-folded region 98 of the airbag cushion 60, which also unfolds easily and rapidly, producing little resistance to the flow of gas. As a result, the accordion-folded region 98 may also substantially deploy before the airbag cushion has expanded significantly toward the vehicle occupant 30.

When the inflation gases reach the roll-folded portion 96 of the airbag cushion 60, expansion of the airbag cushion 60 begins in a longitudinal direction 90, resulting in the advance of the airbag cushion 60 toward the occupant 30 to decelerate and protect the vehicle occupant 30. In some instances, this expansion in a longitudinal direction 90 may be caused by greater resistance to expansion provided by the rolled region 96 of the cushion 60. This may allow proper inflation of the cushion 60, however, to prevent the vehicle occupant from traveling too far forward in the vehicle 12 to allow proper deceleration prior to full inflation of the cushion 60.

Thus, the folding patterns and methods of the invention allow for rapid positioning of an airbag cushion 60 in front of a vehicle occupant 30 before significant expansion in a longitudinal direction 90 has occurred, and then allowing such expansion before complete unrolling of the cushion 60 to assure timely placement of the inflated cushion 60 in the path of the vehicle occupant 30. These folding methods and patterns thus reduce the likelihood of injury to a vehicle occupant 30 resulting from early expansion of the cushion 60 toward the occupant 30, as well as from the occupant 30 being in a position further forward in the vehicle 12 during initial deployment of the airbag cushion 60.

Referring next to FIGS. 4A–4H, a variety of exemplary embodiments of the folding patterns of the invention is shown. Each embodiment is depicted by providing a side plan view of an airbag module showing a plan view of the folding pattern imparted to the cushion part of the module. It would be understood by one of skill in the art that these examples depict only a few potential variations of the folding patterns of the invention. In these exemplary variations, characteristics such as the orientation of the cushion, the direction of the folds, and the number of the folds have been varied. For the purposes of these exemplary folding patterns, the initial folding steps, as illustrated in FIGS. 2A through 2D and discussed in detail above, have been omitted, and only the final plan view has been provided. The plan views provided illustrate wide variations possible in the rolling, accordion-folding, and wrapping steps of the folding methods and patterns of the invention. One of ordinary skill in the art would be able to discern additional patterns within the scope of the invention based upon this disclosure.

In a first such example, FIG. 4A shows an airbag module 110 having a module housing 40, and an inflator 58, the module further including an airbag cushion 160 folded according to a method and pattern of the invention. As noted above, the cushion 160 has previously been prepared as discussed and illustrated in connection with FIGS. 2A through 2D, above. Following this, the cushion 160 was rolled from the cushion end toward the cushion throat, but in this method, the roll-fold 196 produced is oriented toward the occupant face of the airbag cushion 160 instead of toward the windshield face of the cushion 160. This allows the rolled portion 196 of the airbag cushion 160 to unroll toward the occupant of a vehicle after initial positioning of the cushion 160 by the unfolding of the accordion- and wrap-folded regions 200, 198.

Following the rolling step, the airbag cushion 160 received two accordion folds, as in the previous example of FIGS. 2A through 2G. Finally, the cushion 160 was wrap-folded, in this example producing a wrap fold 200 which encompassed only about half of the rolled and accordion-folded portions 196, 198 of the cushion 160 before terminating at the airbag inflator 58. Such a folding pattern having a shortened wrap region 200 may be useful in shorter cushions, or in situations in which less rotation of the cushion 160 is needed during deployment of the cushion 160.

In a next example, FIG. 4B shows an airbag module 210 having a module housing 40, and an inflator 58, the module further including an airbag cushion 260 folded according to a method and pattern of the invention. As noted above, the cushion 260 has previously been prepared as discussed and illustrated in connection with FIGS. 2A through 2D, above. Following this, the cushion 260 was rolled from the cushion end toward the cushion throat. As in FIG. 4A, the roll-fold 296 produced is oriented toward the occupant face of the airbag cushion 260 instead of toward the windshield face of the cushion 260. In this folding method and pattern, the rolling step is followed by placing a single accordion fold 298 in the airbag cushion 260, after which the cushion 260 was wrap-folded. As in FIG. 4A, the wrap fold 300 of FIG. 4B encompasses only about half of the rolled and accordion-folded portions 296, 298 of the cushion 260 before terminating at the airbag inflator 58.

Such a folding pattern having a single accordion fold 298 and a shortened wrap region 300 may be useful in shorter cushions, or in situations in which less rotation of the cushion 260 is needed during deployment of the cushion 260. In addition, such a folding pattern may be useful with a cushion of normal length, but in a circumstance where less unfolding of the cushion 260 is desired prior to longitudinal expansion and inflation of the cushion 260 during deployment. More specifically, smaller wrap-folds 300 and fewer accordion folds 298 may be used where rapid placement of the cushion 260 is desired, followed by more rapid inflation and longitudinal expansion of the cushion 260 are needed than provided in the cushions folded as taught in FIGS. 2A–2G and in FIG. 4A.

Referring next to FIG. 4C, an airbag module 310 with a module housing 40, an inflator 58, and an airbag cushion 360 folded according to a method and pattern of the invention are shown. As noted above, the cushion 360 was prepared as discussed and illustrated in connection with FIGS. 2A through 2D. Following this, the cushion 360 was rolled from the cushion end toward the cushion throat. As in FIGS. 4A and 4B, the roll-fold 396 produced is oriented toward the occupant face of the airbag cushion 360 instead of toward the windshield face of the cushion 360. In this folding method and pattern, the rolling step is followed by placing two accordion folds 298 in the airbag cushion 360. In this step, however, the wrap-folding step shown in the previous figures was omitted.

Such a folding pattern having no wrap fold may be useful in shorter cushions, or in situations in which less rotation of the cushion 360 is needed during deployment. In this example, the orientation of the folded airbag cushion 360 in the housing 40 provides benefits such as the rearward roll generally associated with the wrap-folds seen in the previous examples. More specifically, because the accordion folds 398 force the inflation gases 88 produced by the inflator 58 upward first into the housing, deployment of the cushion 360 may be eased.

Referring next to FIG. 4D, an airbag module 410 is shown. As above, the module 410 has a module housing 40, an inflator 58, and an airbag cushion 460 folded according to a method and pattern of the invention. As noted above, the cushion 460 has previously been prepared as discussed and illustrated in connection with FIGS. 2A through 2D, above. The cushion 460 was rolled from the cushion end toward the cushion throat. The roll-fold 496 produced is oriented toward the occupant face of the airbag cushion 460. In this folding method and pattern, two-and-a-half accordion folds 498 were next made in the airbag cushion 460.

Following the insertion of the accordion folds, the cushion 460 was wrap-folded. In this folding method and pattern, the wrap fold 500 comprises an accordion fold wrapped partially around the rolled and accordion-folded portions 496, 498 of the airbag cushion 460. The wrap fold 500 thus is first oriented such that it would unroll toward the front of a vehicle in which it is placed, and then folds back on itself and returns to the inflator 58 to provide the rearward roll during deployment which may assist in fully deploying the airbag cushion 460 from the housing 40. As in FIGS. 4A and 4B above, the wrap fold 500 of FIG. 4D encompasses only about half of the rolled and accordion-folded portions 496, 498 of the cushion 460, but does so twice before terminating at the airbag inflator 58.

A folding pattern such as that illustrated in FIG. 4D, having extended accordion folds 498 and a doubled wrap region 500 may be useful in longer airbag cushions, or in situations in which it is desirable to deploy and position an extended portion of the cushion (including the wrap-folded and accordion-folded regions 498, 500) before the cushion 460 begins to expand longitudinally within the cabin of the vehicle toward the vehicle occupant.

Referring to FIG. 4E, still another airbag module 510 is shown. As above, the module 510 has a module housing 40, an inflator 58, and an airbag cushion 560 folded according to a method and pattern of the invention. As noted above, the cushion 560 has previously been prepared as discussed and illustrated in connection with FIGS. 2A through 2D, above. The cushion 560 was next rolled from the cushion end toward the cushion throat. As in several of the previous examples, the roll-fold 596 produced is oriented toward the occupant face of the airbag cushion 560. In this folding method and pattern, no accordion-folding was undertaken, and instead, the cushion 560 was wrap-folded.

As in FIG. 4D above, the wrap fold 600 produced in this step comprises an accordion fold wrapped partially around the rolled portion 596 of the airbag cushion 560. The wrap fold 600 thus is first oriented such that it would unroll toward the front of a vehicle in which it is placed, and then folds back on itself to return to the inflator 58 to provide a rearward roll during deployment which may assist in fully deploying the airbag cushion 560 from the housing 40. Also as in FIG. 4D, the wrap fold 600 of FIG. 4E encompasses only about half of the rolled portion 596 of the cushion 560, doing so twice before terminating at the airbag inflator 58.

A folding pattern such as that illustrated in FIG. 4E, having a doubled wrap region 600 provides an alternative pattern which may be useful in longer airbag cushions, or in situations in which it is desirable to deploy and position an extended portion of the cushion (including substantially just the wrap-folded region 600) before the cushion 560 begins to expand longitudinally within the cabin of the vehicle toward the vehicle occupant.

In FIG. 4F, another airbag module 610 is shown. The module 510 has a module housing 40, an inflator 58, and an airbag cushion 660 folded according to a method and pattern of the invention. This cushion 660 has been prepared in a manner substantially identical to the cushion 560 of FIG. 4E, with the exception that the cushion 660 of FIG. 4F was rolled from the cushion end toward the cushion throat to produce a roll-fold 696 produced oriented toward the windshield face of the airbag cushion 660. As in FIG. 4E, no accordion-folding was undertaken, and instead, the cushion 660 was wrap-folded. As in FIGS. 4D and 4E above, the wrap fold 700 produced in this step comprises an accordion fold wrapped partially around the rolled portion 696 of the airbag cushion 660. The wrap fold 700 thus is first oriented such that it would unroll toward the front of a vehicle in which it is placed, and then folds back on itself to return to the inflator 58 to provide a rearward roll during deployment which may assist in fully deploying the airbag cushion 660 from the housing 40. Also as in FIGS. 4D and 4E, the wrap fold 700 of FIG. 4F encompasses only about half of the rolled portion 696 of the cushion 660, doing so twice before terminating at the airbag inflator 58.

A folding pattern such as that illustrated in FIG. 4F, having a doubled wrap region 700 provides an alternative pattern to that of FIG. 4E, which will unroll toward the windshield of a vehicle following the unfolding of the wrap-fold 700. This property may be useful in longer airbag cushions, or in situations in which it is desirable to deploy and position an extended portion of the cushion (including substantially just the wrap-folded region 700) before the cushion 660 begins to expand longitudinally within the cabin of the vehicle toward the vehicle occupant.

Referring next to FIG. 4G, still another airbag module 710 is shown. The module 710 has a module housing 40, an inflator 58, and an airbag cushion 760 folded according to a method and pattern of the invention. As noted above, the cushion 760 has previously been prepared as discussed and illustrated in connection with FIGS. 2A through 2D, above. The cushion 760 was next rolled from the cushion end toward the cushion throat. As in several of the previous examples, the roll-fold 796 produced is oriented toward the occupant face of the airbag cushion 760. The airbag cushion 760 next received two accordion folds 798, and finally, the cushion 760 was wrap-folded. The wrap folds 800 of FIG. 4G thus produced resemble those of FIG. 2G above in that they almost completely surround the roll-folded and accordion-folded portions 896, 898 of the airbag cushion 860. This folding pattern is thus similar to that of FIG. 2G, with the exception that the rolled portion 796 of FIG. 4G is oriented such that it will unroll toward a vehicle occupant when mounted in a vehicle and deployed.

Referring finally to FIG. 4H, still another airbag module 810 is shown. The module 810 has a module housing 40, an inflator 58, and an airbag cushion 860 folded according to a method and pattern of the invention. As noted above, the cushion 860 has previously been prepared as discussed and illustrated in connection with FIGS. 2A through 2D, above. The cushion 860 was next rolled from the cushion end toward the cushion throat. The roll-fold 896 produced is oriented toward the windshield face of the airbag cushion 860. As a result, when mounted in a vehicle and deployed, this portion of the airbag cushion 860 will unroll toward the windshield of the vehicle. Following the rolling step, the airbag cushion 860 was accordion-folded, receiving less than two accordion-folds 898. Following the accordion-folding, the cushion 860 was wrap-folded. In this Figure, the wrap fold 900 produced in this step encompasses ¾ of the rolled and accordion-folded portions 896, 898 of the airbag cushion 860. The wrap fold 900 is again oriented such that it would unroll toward the rear of a vehicle in which it is installed to provide a rearward roll during deployment which may assist in fully deploying the airbag cushion 860 from the housing 40.

A folding pattern such as that illustrated in FIG. 4H having accordion-folds 898 and a wrap fold 900 may be useful in longer airbag cushions, or in situations in which it is desirable to deploy and position an extended portion of the cushion (including the wrap-folded region 900 and the accordion-folded region 898) before the cushion 860 begins to expand longitudinally within the cabin of the vehicle toward the vehicle occupant.

Thus the present invention provides a family of related folding methods and patterns for folding an airbag to be installed in a vehicle. In some embodiments, the invention provides folding methods useful with overhead airbag cushions. These folding methods and patterns assist in controlling the trajectory of the airbag cushion during deployment. More specifically, the methods and patterns of the invention may allow an airbag cushion to be deployed forwardly and downward along a windshield to place a portion of the airbag cushion rapidly in front of a vehicle occupant before significantly inflating the cushion in a longitudinal direction to provide support and deceleration to a vehicle occupant.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A method of folding an airbag cushion comprising the steps of:

providing an overhead airbag cushion, the airbag cushion having a cushion throat, a windshield face, an occupant face, first and second lateral sides, and a cushion end;

flattening the windshield and occupant faces of the airbag cushion;

folding the first and second lateral sides of the airbag cushion to flatten them against a face of the airbag cushion;

rolling a portion of the airbag cushion from the cushion end toward the cushion throat;

accordion-folding the airbag cushion from the rolled portion toward the cushion throat; and wrap-folding the airbag cushion toward the cushion throat.

2. The method of claim 1, wherein the step of folding the first and second lateral sides of the airbag to flatten them against a face of the airbag cushion comprises folding the first and second lateral sides over against the windshield face of the airbag cushion.

3. The method of claim 1, wherein the step of folding the first and second lateral sides of the airbag to flatten them against a face of the airbag cushion comprises folding the first and second lateral sides against the occupant face of the airbag cushion.

4. The method of claim 1, wherein the step of folding the first and second lateral sides of the airbag to flatten them against a face of the airbag cushion produces an overlap of the first and second lateral sides.

5. The method of claim 1, wherein the portion of the airbag cushion rolled from the cushion end toward the cushion throat is a portion of the airbag desired to deploy following the initial deployment and placement of the wrap-folded and accordion-folded portions of the airbag cushion.

6. The method of claim 1, wherein the portion of the airbag cushion rolled from the cushion end toward the cushion throat is rolled toward the windshield face of the airbag cushion.

7. The method of claim 1, wherein the portion of the airbag cushion rolled from the cushion end toward the cushion throat is rolled toward the occupant face of the airbag cushion.

8. The method of claim 1, wherein the portion of the airbag folded in the step of accordion-folding the airbag cushion from the rolled portion toward the cushion throat is a portion of the airbag configured to deploy following initial deployment and placement of the wrap-folded portion of the airbag cushion.

9. The method of claim 8, wherein the step of accordion-folding the airbag cushion from the rolled portion forward toward the cushion throat produces from about 0 to about 8 accordion folds.

10. The method of claim 9, wherein the step of accordion-folding the airbag cushion from the rolled portion forward toward the cushion throat produces from about 1 to about 4 accordion folds.

11. The method of claim 10, wherein the step of accordion-folding the airbag cushion from the rolled portion forward toward the cushion throat produces 2 accordion folds.

12. The method of claim 1, wherein the step of wrap-folding the airbag cushion toward the cushion throat comprises folding the airbag cushion about the rolled and accordion-folded portions of the airbag cushion.

13. The method of claim 12, wherein the step of wrap-folding the airbag cushion comprises folding the airbag cushion about the rolled and accordion-folded portions of the airbag cushion toward the occupant face of the airbag cushion.

14. The method of claim 13, wherein the wrap-fold substantially encompasses the rolled and accordion-folded portions of the airbag cushion.

15. The method of claim 13, wherein the wrap-fold encompasses about ¾ of the rolled and accordion-folded portions of the airbag cushion.

16. The method of claim 13, wherein the wrap-fold encompasses about ½ of the rolled and accordion-folded portions of the airbag cushion.

17. The method of claim 13, wherein the wrap-fold encompasses about ¼ of the rolled and accordion-folded portions of the airbag cushion.

18. The method of claim 12, wherein the step of wrap-folding the airbag cushion comprises folding the airbag cushion about the rolled and accordion-folded portions of the airbag cushion toward the windshield face of the airbag cushion.

19. A method of folding an airbag cushion comprising the steps of:

providing an airbag cushion, the airbag cushion having a cushion throat, a windshield face, an occupant face, first and second lateral sides, and a cushion end;

flattening the windshield and occupant faces of the airbag cushion;

tucking the cushion end inwardly to form a bottom tuck and first and second pairs of lateral edges;

folding the first and second pairs of lateral edges of the airbag cushion to flatten them against a face of the airbag cushion;

rolling a portion of the airbag cushion from the cushion end toward the cushion throat;

accordion-folding the airbag cushion from the rolled portion toward the cushion throat; and wrap-folding the airbag cushion toward the cushion throat;

wherein the step of folding the first and second pairs of lateral edges over comprises folding the first and second pairs of lateral edges such that they overlap each other.

20. The method of claim 19, wherein the step of tucking the cushion end inwardly is repeated at least once to form two bottom tucks.

21. The method of claim 19, wherein the step of folding the first and second pairs of lateral edges over comprises folding first edges of the first and second pairs of lateral edges and next folding second edges of the first and second pairs of lateral edges.

22. The method of claim 21, wherein the step of folding the first and second pairs of lateral edges over comprises folding first edges of the first and second pairs of lateral edges and next folding second edges of the first and second pairs of lateral edges such that they overlap each other.

23. The method of claim 19, wherein the step of folding the first and second pairs of lateral edges to flatten them against a face of the airbag cushion comprises folding the first and second pairs of lateral edges against the windshield face of the airbag cushion.

24. The method of claim 19, wherein the step of folding the first and second pairs of lateral edges to flatten them against a face of the airbag cushion comprises folding the first and second pairs of lateral edges against the occupant face of the airbag cushion.

25. The method of claim 19, wherein the portion of the airbag cushion rolled from the cushion end toward the cushion throat is a portion of the airbag configured to deploy following initial deployment and placement of the wrap-folded and accordion-folded portions of the airbag cushion.

26. The method of claim 25, wherein the portion of the airbag cushion rolled from the cushion end toward the cushion throat is rolled toward the windshield face of the airbag cushion.

27. The method of claim 25, wherein the portion of the airbag cushion rolled from the cushion end toward the cushion throat is rolled toward the occupant face of the airbag cushion.

28. The method of claim 19, wherein the portion of the airbag folded in the step of accordion-folding the airbag cushion from the rolled portion toward the cushion throat is a portion of the airbag configured to deploy following initial deployment and placement of the wrap-folded portion of the airbag cushion.

29. The method of claim 28, wherein the step of accordion-folding the airbag cushion from the rolled portion forward toward the cushion throat produces from about 0 to about 8 accordion folds.

30. The method of claim 28, wherein the step of accordion-folding the airbag cushion from the rolled portion forward toward the cushion throat produces from about 1 to about 4 accordion folds.

31. The method of claim 28, wherein the step of accordion-folding the airbag cushion from the rolled portion forward toward the cushion throat produces 2 accordion folds.

32. The method of claim 19, wherein the step of wrap-folding the airbag cushion toward the cushion throat comprises folding the airbag cushion about the rolled and accordion-folded portions of the airbag cushion.

33. The method of claim 32, wherein the step of wrap-folding the airbag cushion comprises folding the airbag cushion about the rolled and accordion-folded portions of the airbag cushion such that the wrap-fold produced would unfold oriented toward the occupant of a vehicle when mounted and installed in a vehicle.

34. The method of claim 33, wherein the wrap-fold substantially encompasses the rolled and accordion-folded portions of the airbag cushion.

35. The method of claim 33, wherein the wrap-fold encompasses about ¾ of the rolled and accordion-folded portions of the airbag cushion.

36. The method of claim 33, wherein the wrap-fold encompasses about ½ of the rolled and accordion-folded portions of the airbag cushion.

37. The method of claim 33, wherein the wrap-fold encompasses about ¼ of the rolled and accordion-folded portions of the airbag cushion.

38. The method of claim 19, wherein the airbag cushion is an overhead airbag cushion.

39. The method of claim 19, wherein the step of wrap-folding the airbag cushion comprises folding the airbag cushion about the rolled and accordion-folded portions of the airbag cushion such that the wrap-fold produced would unfold oriented toward the windshield of a vehicle when mounted and installed in a vehicle.

40. A method of folding an overhead airbag cushion comprising the steps of:

providing an overhead airbag cushion, the overhead airbag cushion having a cushion throat, a windshield face, first and second lateral sides, and a cushion end;

flattening the windshield and occupant faces of the overhead airbag cushion;

tucking the cushion end inwardly to form a bottom tuck and first and second pairs of lateral edges;

folding the first and second pairs of lateral edges of the airbag cushion to flatten them against a face of the overhead airbag cushion;

rolling a portion of the airbag cushion from the cushion end toward the cushion throat;

accordion-folding the airbag cushion from the rolled portion toward the cushion throat; and wrap-folding the airbag cushion toward the cushion throat.

41. The method of claim 40, wherein the step of tucking the cushion end of the airbag inwardly is repeated at least once to decrease the folded length of the overhead airbag cushion.

42. The method of claim 40, wherein the step of folding the first and second pairs of lateral edges to flatten them against a face of the overhead airbag cushion comprises folding the first and second pairs of lateral edges against the windshield face of the airbag cushion.

43. The method of claim 40, wherein the step of folding the first and second pairs of lateral edges to flatten them against a face of the overhead airbag cushion comprises folding the first and second pairs of lateral edges against the occupant face of the airbag cushion.

44. The method of claim 40, wherein the step of folding the first and second pairs of lateral edges to flatten them against a face of the overhead airbag cushion produces an overlap of the first and second lateral sides.

45. The method of claim 40, wherein the step of folding the first and second pairs of lateral edges over comprises folding first edges of the first and second pairs of lateral edges inwardly and next folding second edges of the first and second pairs of lateral edges inwardly.

46. The method of claim 45, wherein the step of folding the first and second pairs of lateral edges comprises folding first edges of the first and second pairs of lateral edges inwardly and next folding second edges of the first and second pairs of lateral edges inwardly such that they overlap each other.

47. The method of claim 40, wherein the portion of the airbag cushion rolled from the cushion end toward the cushion throat is a portion of the airbag configured to deploy following initial deployment and placement of the wrap-folded and accordion-folded portions of the airbag cushion.

48. The method of claim 47, wherein the portion of the airbag cushion rolled from the cushion end toward the cushion throat is rolled toward the windshield face of the airbag cushion.

49. The method of claim 47, wherein the portion of the airbag cushion rolled from the cushion end toward the cushion throat is rolled toward the occupant face of the airbag cushion.

50. The method of claim 40, wherein the portion of the airbag folded in the step of accordion-folding the airbag cushion from the rolled portion toward the cushion throat is a portion of the airbag configured to deploy following initial deployment and placement of the wrap-folded portion of the airbag cushion.

51. The method of claim 50, wherein the step of accordion-folding the airbag cushion from the rolled portion forward toward the cushion throat produces from about 0 to about 8 accordion folds.

52. The method of claim 51, wherein the step of accordion-folding the airbag cushion from the rolled portion forward toward the cushion throat produces from about 1 to about 4 accordion folds.

53. The method of claim 52, wherein the step of accordion-folding the airbag cushion from the rolled portion forward toward the cushion throat produces 2 accordion folds.

54. The method of claim 40, wherein the step of wrap-folding the airbag cushion toward the cushion throat comprises folding the airbag cushion about the rolled and accordion-folded portions of the airbag cushion.

55. The method of claim 54, wherein the step of wrap-folding the airbag cushion comprises folding the airbag cushion about the rolled and accordion-folded portions of the airbag cushion such that the wrap-fold produced would unfold oriented toward the occupant of a vehicle when mounted and installed in a vehicle.

56. The method of claim 55, wherein the wrap-fold substantially encompasses the rolled and accordion-folded portions of the airbag cushion.

57. The method of claim 56, wherein the wrap-fold encompasses about ¾ of the rolled and accordion-folded portions of the airbag cushion.

58. The method of claim 57, wherein the wrap-fold encompasses about ½ of the rolled and accordion-folded portions of the airbag cushion.

59. The method of claim 58, wherein the wrap-fold encompasses about ¼ of the rolled and accordion-folded portions of the airbag cushion.

* * * * *